March 10, 1964 R. B. HOPGOOD 3,123,904
METHOD OF MAKING A LIPSTICK CONTAINER OR THE LIKE
Filed Jan. 17, 1962 2 Sheets-Sheet 1
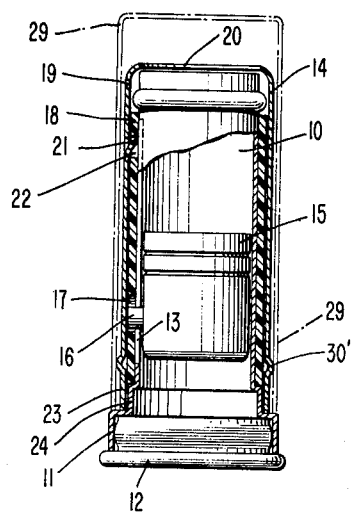
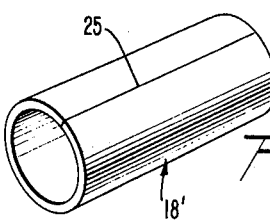
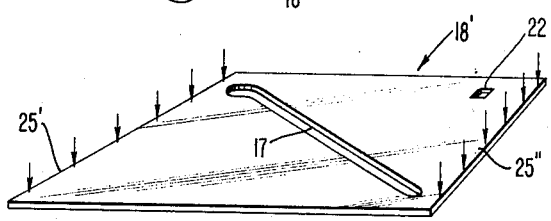
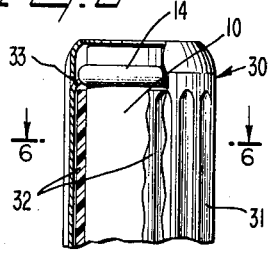
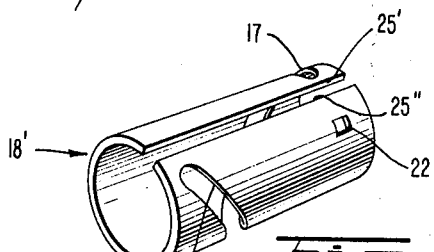
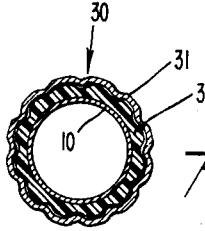
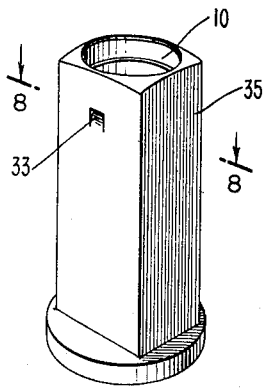
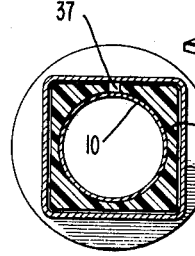
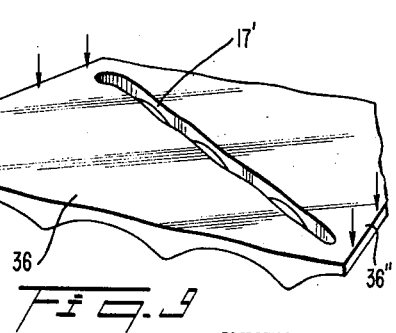
INVENTOR.
ROBERT B. HOPGOOD
BY
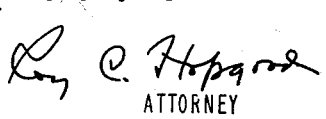
ATTORNEY March 10, 1964
R. B. HOPGOOD
3,123,904
METHOD OF MAKING A LIPSTICK CONTAINER OR THE LIKE
Filed Jan. 17, 1962
2 Sheets-Sheet 2
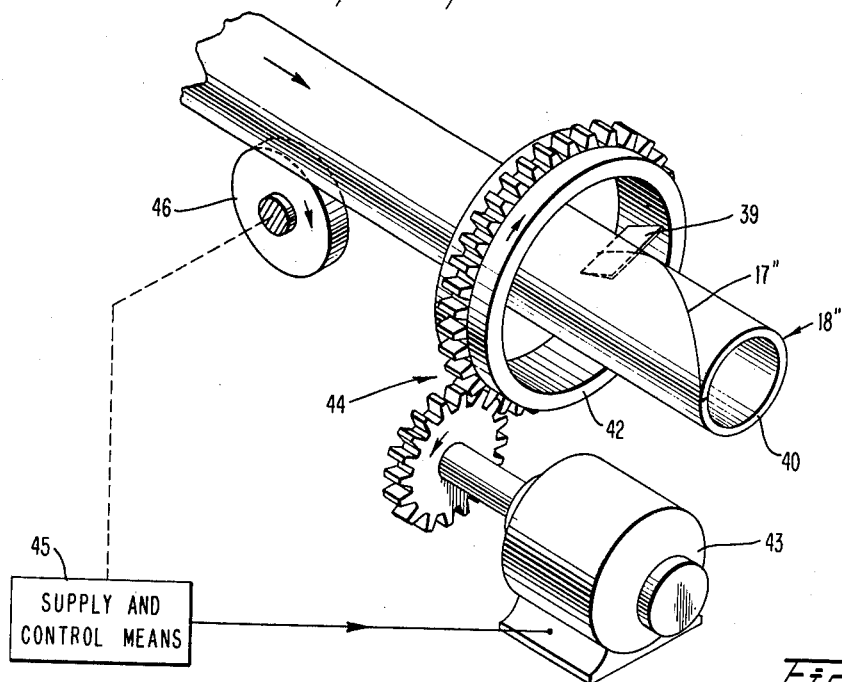
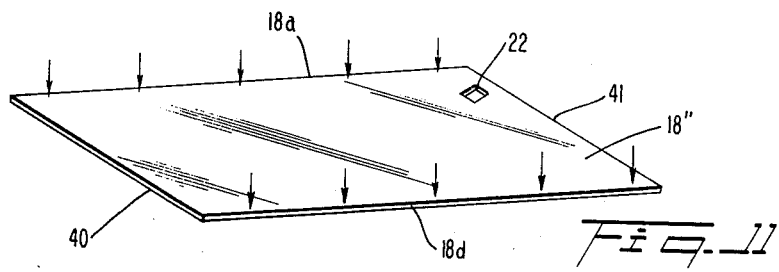
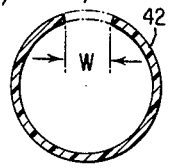
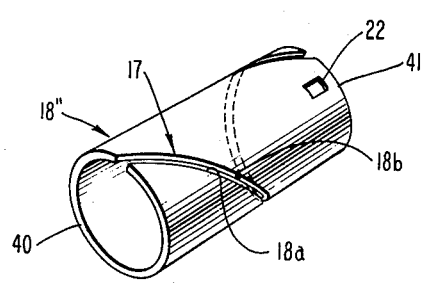
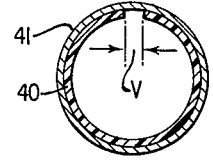
INVENTOR.
ROBERT B. HOPGOOD
BY
Roy C. Hopgood
ATTORNEY

United States Patent Office 3,123,904
Patented Mar. 10, 1964

---

3,123,904
METHOD OF MAKING A LIPSTICK CONTAINER OR THE LIKE
Robert B. Hopgood, Thompson, Conn., assignor, by mesne assignments, to Nicholson File Company, Providence, R.I., a corporation of Rhode Island
Filed Jan. 17, 1962, Ser. No. 166,835
11 Claims. (Cl. 29—417)

My invention relates to an improved casing construction applicable to lipstick containers or the like of the rotary-propulsion variety. This application is a continuation-in-part of my copending application, Serial No. 48,444, filed August 9, 1960.

Another object is to provide an improved method of making a rotary-lipstick container construction characterized by extreme ease of action.

A further object is to provide an improved method of making a lipstick-container construction characterized by inherently less critical dependence on small tolerance limitations than is characteristic of present-day lipstick containers.

A still further object is to provide an improved method of making a rotary-lipstick construction featuring a novel cam sleeve as a part thereof, wherein a given size of cam sleeve may inherently serve a plurality of lipstick-container diameters with equal facility and effectiveness.

Other objects and various further features of novelty and invention will be pointed out or will occur to those skilled in the art from a reading of the following specification in conjunction with the accompanying drawings. In said drawings, which show, for illustrative purposes only, preferred forms of the invention:

FIG. 1 is a longitudinal sectional view through a rotary lipstick container assembly embodying features of the invention;

FIGS. 2, 3 and 4 are perspective views to illustrate my novel method of fabricating the cam sleeve for the container of FIG. 1;

FIG. 5 is a fragmentary view in elevation, partly broken away and in longitudinal section and illustrating a modification of the container of FIG. 1;

FIG. 6 is a sectional view taken on the plane 6—6 of FIG. 5;

FIG. 7 is a perspective view of another form of container construction of the invention;

FIG. 8 is a sectional view in the plane 8—8 of FIG. 7;

FIG. 9 is a view in perspective, similar to FIG. 3 but illustrating a step in the method when applied to a construction as illustrated in FIGS. 7 and 8;

FIGS. 10, 11, and 12 are views analogous to FIGS. 2, 3 and 4 respectively, to illustrate a further modification, certain of the fabricating apparatus being shown schematically in FIG. 10; and FIGS. 13 and 14 are transverse sectional views to illustrate steps in an alternative method of the invention.

Briefly stated, my invention contemplates an improved lipstick-container construction featuring the use of thermoplastic material, such as acetal resin, polycarbonate resin, chlorinated polyether resin, polyamide resin, polyolefin resin, and similar resins, some of which are known variously in the trade as nylon, Delrin, Lexan, Penton, polyethylene, polypropylene, in one of the two bacis relatively rotatable tubular parts of the container. The plastic part is preferably so formed as to be inherently resiliently stressed in substantially continuous sliding contact with the adjacent surface of the other tubular member, this being contrary to conventional concepts of lipstick-container fabrication. In the forms to be described, the inner of the two rotatable members is of conventional metal construction, and the thermoplastic material is utilized in the cam sleeve cooperating therewith. The thermoplastic material of the one rotatable part is found, in conjunction with the metal of the other rotatable part, to develop virtually a self-lubricated relation, assuring ease of action. Various forms of the invention will be described.

In FIG. 1, I illustrate application of the invention to a more or less conventional container, comprising an inner tubular member or shell 10 having an enlarged base 11 closed by a snap button 12 which (with base 11) may constitute the base operating handle of the assembly. The inner member or shell 10 may include a cam element such as the conventional straight slot 13 running essentially the full longitudinal extent of the shell, but which preferably terminates at or near a circumferential bead 14.

Slidable within the inner shell 10 is a carrier 15 for lipstick material (not shown), said carrier being provided with outwardly extending cam-follower means 16 received in the cam slot 13 and projecting also into another cam slot 17 on an outer rotatable member or sleeve 18. To conform with conventional practice if the slot 13 is straight, then the cam slot 17 in the sleeve 18 may be helical or spiral.

To complete the basic assembly, an outer casing 19 surrounds the inner shell 10 and sleeve 18, all except for the base portion 11—12. The casing 19 is of course open at 20, to permit outward propulsion of lipstick carried by the carrier 15. A key or locking lug 21 is shown formed inwardly from the material of the casing 19 and in engagement with a localized opening or aperture 22 in the sleeve 18. The upper end of the casing 19 receives bearing support from the bead 14, and the lower end 23 thereof may receive bearing support from a step 24 in the base portion 11 of inner shell 10. Thus, upon rotation of the base portion 10—12 with respect to the casing 19, the cams 13—17 cooperate with the cam-follower means 16 to propel and retract the carrier 15 within the inner shell 10 in the customary manner. A removable closure cap 30 surrounds casing 19 and has frictional engagement therewith, as at bumps or nibs 30'.

In accordance with the invention, the sleeve member 18 is of a material different from that of the inner shell 10, and these materials are so related to each other that in the presence of continuous resilient sliding contact between these members a self-lubricated action is achieved. Preferably, the inner shell 10 is of conventional metallic construction, e.g., of brass, steel or the like, and the sleeve 18 is of a thermoplastic material, such as one of those noted above, having effectively, a self-lubricated sliding co-action therewith; of these materials, I have a present preference for nylon or Delrin.

In order to achieve the continuous resiliently loaded sliding contact between sleeve 18 and inner shell 10, I prefer that sleeve 18 shall be circumferentially continuous except for a slight discontinuity which enables the sleeve 18 to adapt itself to small variations in outer diameter of the inner shell 10. A novel method of suitably forming the sleeve 18 to meet this requirement is illustrated in FIGS. 2, 3 and 4.

As illustrated in FIG. 2, the sleeve 18 is made from tubular plastic stock which may either be extruded and fed as a continuous tube or, as in the form shown, may be cut off into lengths such as the length 18' shown in FIG. 2, such length being the ultimate finished length needed to form a blank for assembly as in FIG. 1. The tubular material 18' is longitudinally slitted, as at 25, to define the discontinuity mentioned above. The piece 18' may then be flexed and flattened as illustrated in FIG. 2, pressure being applied along the edges 25'—25", as indicated by downward arrows, to hold the piece 18' flat against a suitable table (not shown). In this flattened position, the spiral slot 17 and aperture 22 may be blanked by conventional piercing tools, and, having completed the piercing operation, the piece may be released and allowed to resume its tubular shape. This resumed tubular shape will be of the general appearance of FIG. 2 but, of course, with the spiral slot 22 formed therein.

Alternatively, and as also suggested by FIGS. 3 and 4, the extruded continuous tube may be continuously slitted at 25, then flattened, blanked, cut-off, and allowed to reform into a tubular length. This method avoids any need to handle cut-off tubing when blanking the spiral cam 17.

As indicated above, I prefer that when assembled on the outer surface of the inner shell 10 there shall be a continuous resilient pressure of the sleeve 18 on the shell 10. This is achieved by forming the piece 18' from tubular stock having a nominal internal diameter which is something less than the outer diameter of the surface on shell 10 to be engaged thereby, so that upon assembly to shell 10 the edges 25'—25" will be separated. In FIG. 4, I illustrate by separation of edges 25'—25" a typical separation which will suffice for purposes of achieving the light resiliency alluded to.

In FIG. 5 and FIG. 6, I show a slightly modified form wherein the inner shell 10 may be exactly the same as described for FIG. 1 but wherein for decorative or other reasons the outer casing 30 is provided with fluting or other non-circular formations 31 which may additionally serve the function of developing a keying engagement with the plastic sleeve member 32. Thus, the cam member or sleeve 32 may be generally corrugated in shape, again preferably resiliently loaded to ride the outer surface of inner shell 10 and, of course, provided with the cam slot at 17, as for the case of FIGS. 1 to 4. The bore of sleeve 32 may be smooth, as shown, so that cam follower engagement with slot 17 may be uniformly smooth. Retention of the casing 30 may be achieved by an inwardly struck lug 33 formed out of the casing 30 and having snap engagement with the bead 14 upon assembly.

In FIGS. 7, 8 and 9, I illustrate a further form of the invention featuring the plastic cam sleeve of the invention and again adapted to a non-circular casing configuration. The outer casing in FIGS. 7 and 8 is shown at 35 to be of generally square or rectangular prismatic shape and to receive plastic sleeve member 36 therewithin. Preferably, a slight clearance exists between sleeve 36 and casing 35, and there is again the resiliently stressed frictional relation between sleeve 36 and the inner shell 10. The discontinuity or clearance 37 suggests that, initially, the sleeve 36 may be of solid continuous rectangular prismatic outer form but with a circular bore and slitted at 37 to permit adaptability to variations in outer diameters of the inner shell 10. The necessary shape for such sleeves 36 may be precast or it may be extruded and slitted by conventional means, and in FIG. 9 I suggest (in a manner similar to that employed in FIG. 3) that the slitted sleeve 36 may be flattened for performing the blanking operation to produce the spiral slot 17'. After blanking, the piece 36 may be released to assume its unstressed shape, in readiness for assembly to the inner shell 10.

In FIGS. 10, 11 and 12, I illustrate a further embodiment of the invention, for the situation in which the cam sleeve 18", when flat, is of parallelogram shape, the cam "slot" 17" thereof being defined by opposed sides 18a—18b of the parallelogram. Starting with continuous tubular stock, as shown being fed from left to right in FIG. 10, a knife blade 39 continuously makes a spiral cut 17", which ultimately becomes the spiral cam slot. The tubular stock may be continuously rotated at a proper speed related to the feed speed, for a stationary knife 39 to develop the desired helical advance angle for cut 17". Alternatively, and as suggested in FIG. 10, the tubular stock is fed longitudinally without rotation, and the knife blade 39 is carried by a ring 42 which is suitably journaled (by means not shown) about the axis of the tubular stock. The blade 39 may be set at a correct angle to the axis of the tubular stock to develop the desired spiral cut by merely allowing ring 42 to rotate freely; however, in the form shown, a preference is indicated for a positive rotary drive to ring 42, as by motor 43 and gear means 44, controlled by means 45 responsive (via friction wheel 46) to the longitudinal feed speed of the tubular stock. The slitted tubular stock may be cut off to desired length and may be flattened by applying pressure at spiral edges 18a—18b, for blanking to define hole 22 and external dimensions, such as the edges 40—41 (FIG. 11). Alternatively, and preferably, cut off to desired length may be performed after slitting, flattening and blanking. Upon subsequent release, the tubular shape is resumed, except that upon assembly to inner shell 10, and with proper choice of dimensions, the resilient wrapping of sleeve 18" on shell 10 will occur for a desired ultimate "slot" gap between spiral edges 18a—18b, as indicated at 17" in FIG. 12.

FIGS. 13 and 14 illustrate steps in an alternative method wherein the plastic cam-sleeve member 40 is resiliently stressed against the bore of the outer shell or casing 41. For this purpose, tubular plastic stock 42 is selected with an outer diameter exceeding the bore diameter of outer shell or casing 41. A longitudinally continuous slit is then made in this stock, the width W of the slit being such as to reduce the peripheral extent of tube 42 to become at least no greater than the circumferential extent of the bore of casing 41. The slitted tube may then be flattened for cam-slot piercing, as already described. Final assembly is made by releasing the flattened material and radially compressing the same enough to permit axial insertion in casing 41. Upon release, the assembled parts will be resiliently held in the relation of FIG. 14.

If desired, the slit width may be selected to permit the desired radial compression and also to leave a slot of width V after assembly in casing 41, the width V being predetermined to accommodate the cam follower of the lipstick. The slit may thus define one of the propulsion cams, of straight or spiral nature, as needed to develop proper propulsion action in the fully assembled container.

In operation, containers of my invention are found to be remarkably free from rattle and are extremely smooth running. It makes little difference what the initial unstressed diameter of the tubular stock from which the sleeve 18 or 32 or 36 or 40 is formed, as long as this unstressed diameter is equal to or less than the outer diameter of the member on which it is to ride for the forms of FIGS. 1, 5, and 7, thus assuring the constant and continuous frictional engagement characteristic of the invention; for the form of FIG. 14, it makes little difference what the initial unstressed outer diameter of stock 42 as long as this diameter equals or exceeds the bore diameter of casing 41.

While I have described the invention in detail in connection with a lipstick container and for the preferred forms illustrated, it will be understood that it may be otherwise applied and that modifications may be made within the scope of the invention as defined in the claims which follow.

I claim:
1. The method of forming from tubular plastic stock a cam sleeve to hub the cylindrical periphery of the inner shell member of a lipstick container or the like, which comprises the initial step of generally longitudinally slitting the tubular stock at one end thereof, the second step of flexing the slitted length of the tube and holding the same substantially flat, the third step of blanking the flattened length of stock, one of said initial and third steps producing a spiral cam-forming cut in said length of stock, and the final step of releasing the flattened blank to permit it to move toward restoration of its tubular shape, the inner shell member being placed with- in and in axial alignment with the axis of said blank, whereby the released blank resiliently hugs the periphery of the inner shell member.

2. The method of claim 1 in which said slitting is at an angle to the longitudinal axis of said tubular stock, whereby the cam-forming cut is produced in said initial step.

3. The method of claim 1 in which said blanking includes piercing to form the cam slot.

4. The method of forming from tubular plastic stock a cam sleeve to hug the cylindrical periphery of an inner shell member for a lipstick container or the like, said stock having an inside diameter less than the diameter of said cylindrical periphery, which comprises longitudinally slitting the tubular stock, flexing the slitted tube and holding the same substantially flat, piercing the flattened stock to form a cam slot, releasing the flattened stock to restore its tubular shape with the cam slot formed therein, and axially inserting the inner shell member within said stock and against the resiliency of said stock, whereby said stock will be resiliently preloaded into hugging relation with said cylindrical periphery.

5. The method fof forming from tubular plastic stock a cam sleeve to retain itself within the bore of a cylindrical outer shell member of a lipstick container or the like, said stock having an outer diameter greater than the bore diameter of said outer shell member, which comprises longitudinally slitting the tubular stock to remove a longitudinally continuous strip from said stock thereby reducing its peripheral extent by an amount approximating the width of said strip, said reduced peripheral extent being at least no greater than the circumferential extent of the bore of said outer shell member, radially compressing the slitted stock, axially inserting the compressed stock within said bore and releasing said stock to radially outwardly resiliently engage said bore.

6. The method of claim 5, and including the steps of flattening the slitted stock, and piercing the flattened stock to form a cam slot.

7. The method of forming from tubular plastic stock a cam sleeve to hug the cylindrical periphery of an inner shell member for a lipstick container or the like, said stock having an inside diameter less than the diameter of said cylindrical periphery, which comprises longitudinally slitting the tubular stock at one end thereof, flexing the slitted end and holding an elongated length thereof substantially flat, piercing and cutting off said length to form a blank with a cam slot therein, releasing the flattened blank to restore its tubular shape with the cam slot formed therein, and axially inserting the inner shell member within said blank and against the resiliency of said blank, whereby said blank will be resiliently preloaded into hugging relation with said cylindrical periphery.

8. The method of forming from tubular plastic stock a cam sleeve to hug the cylindrical periphery of an inner shell member for a lipstick container or the like, said stock having an inside diameter less than the diameter of said cylindrical periphery, which comprises longitudinally slitting the tubular stock at one end thereof, flexing the slitted end and holding an elongated length thereof substantially flat, piercing and cutting off said length to form a blank with a cam slot therein, placing the inner shell member on the substantially flattened blank in substantially the axial alignment of the blank when unstressed, and releasing the flattened blank to permit restoration of cylindrical shape, whereby upon full release said blank will be resiliently preloaded into hugging relation with said cylindrical periphery.

9. The method of forming from tubular plastic stock a cam sleeve to hug the cylindrical periphery of an inner shell member for a lipstick container or the like, said stock having an inside diameter less than the diameter of said cylindrical periphery, which comprises longitudinally spirally slitting the tubular stock, whereby a slit blank is formed, and axially inserting the inner shell member within said blank and against the resiliency of said blank, whereby said blank will be resiliently preloaded into hugging relation with said cylindrical periphery.

10. The method of forming from tubular plastic stock a cam sleeve to resiliently retain itself in substantially continuous circumferential contact with a tubular shell member for a lipstick container or the like, said stock having an outside diameter greater than the bore diameter of said inner shell member, which comprises longitudinally slitting the tubular stock at one end thereof, flexing the slitted end and holding an elongated length thereof substantially flat, piercing and cutting off said length to form a blank with a cam slot therein, said blank being thereby cut to a width at least no greater than the circumferential extent of the bore of said inner shell member, releasing the flattened blank to restore its tubular shape with the cam slot formed therein, further circumferentially flexing the blank to compress the same to at least the bore diameter of said inner shell, axially inserting the compressed blank into said bore, and releasing the blank to resiliently retain the same in substantially continuous circumferential contact with said bore.

11. The method of forming from tubular plastic stock a cam sleeve to resiliently retain itself in substantially continuous circumferential contact with a tubular shell member for a lipstick container or the like, said stock having an outside diameter greater than the bore diameter of said inner shell member, which comprises spirally slitting the tubular stock to remove a spirally progressing uniform width strip to reduce the total peripheral extent of the slit stock to a magnitude at least no greater than the circumferential extent of the bore of said inner shell member, whereby a slit blank is formed, circumferentially flexing the blank to compress the same to at least the bore diameter of said inner shell, axially inserting the compressed blank into said bore, and releasing the blank to resiliently retain the same in substantially continuous circumferential contact with said bore.

References Cited in the file of this patent

UNITED STATES PATENTS

| | | |
|---|---|---|
| 904,451 | Richards | Nov. 17, 1908 |
| 1,028,066 | Smith | May 28, 1912 |
| 2,749,603 | Trussell | June 12, 1956 |
| 3,050,842 | Evans | Aug. 28, 1962 |